Figure 1:
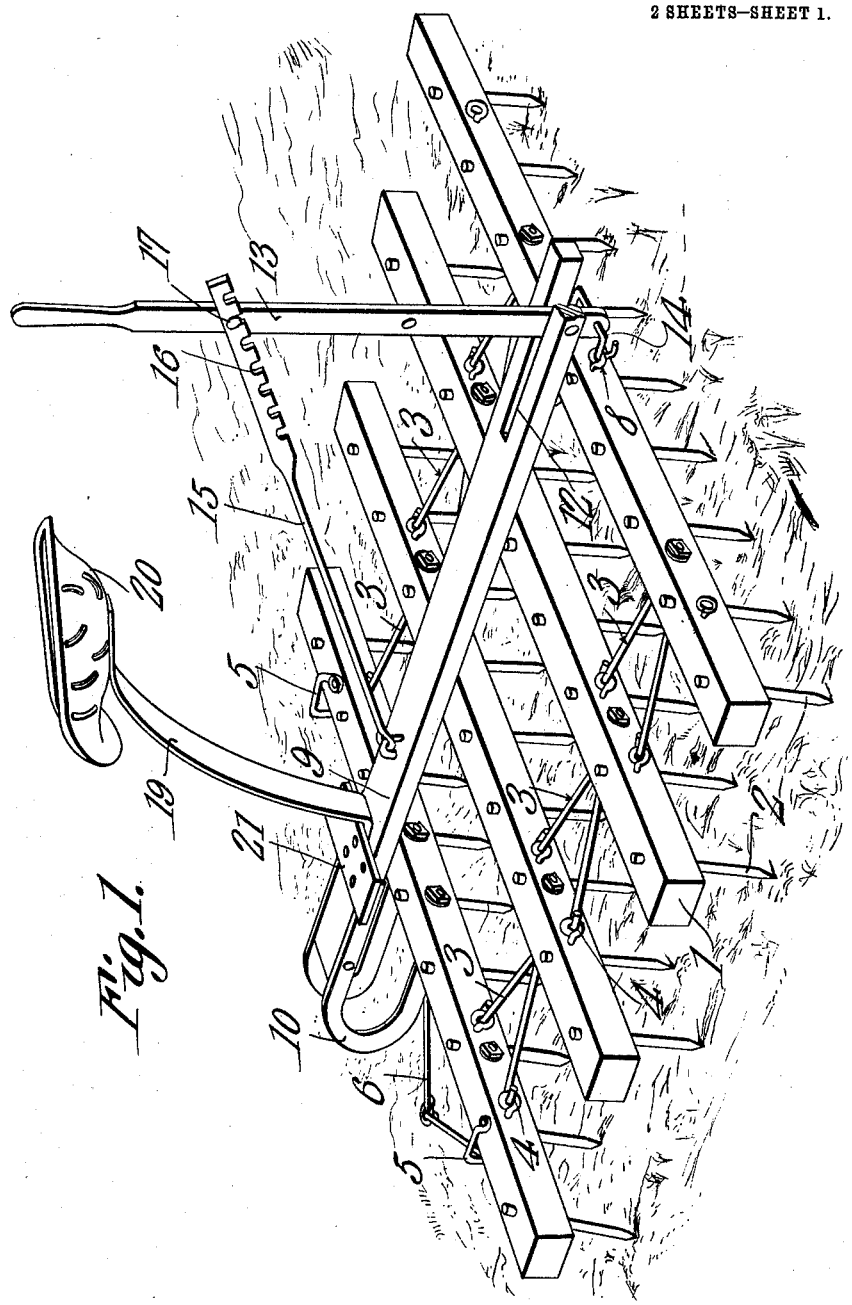

J. S. JONES.
HARROW.
APPLICATION FILED FEB. 1, 1910.

1,006,482.

Patented Oct. 24, 1911.

2 SHEETS—SHEET 1.

Witnesses
E. T. Stewart
A. Easterday

Inventor
James S. Jones
By C. A. Snow & Co.
Attorneys

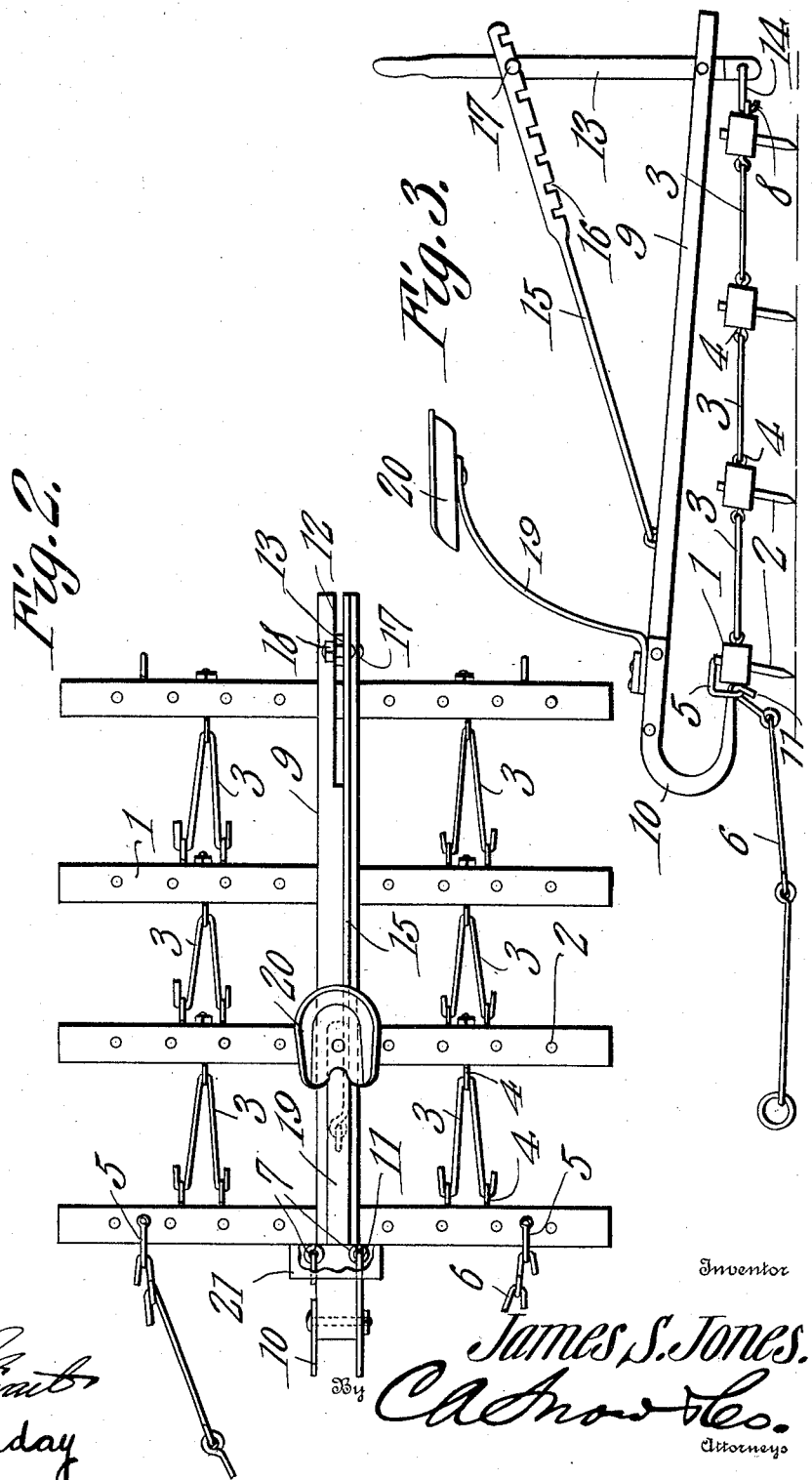

UNITED STATES PATENT OFFICE.

JAMES SAMUEL JONES, OF HARRISON, ARKANSAS.

HARROW.

1,006,482. Specification of Letters Patent. Patented Oct. 24, 1911.

Application filed February 1, 1910. Serial No. 541,326.

*To all whom it may concern:*

Be it known that I, JAMES S. JONES, a citizen of the United States, residing at Harrison, in the county of Boone and State of Arkansas, have invented a new and useful Harrow, of which the following is a specification.

This invention has relation to harrows and it consists in the novel construction and arrangement of its parts as hereinafter shown and described.

The subject matter of the present invention is designed to be used upon harrow structures which consist of a series of beams linked together and the object of the invention is to provide means for holding the said beams in desired relation to each other whereby the teeth carried by the beams may be inclined with their pointed ends forwardly disposed at any desired angle to the surface of the soil or the said beams may be so positioned that the pointed ends of the teeth will be rearwardly disposed and consequently readily free themselves of the accumulation of trash as the implement is drawn over the surface of the soil.

With the above objects in view the attachment consists of a bar having at its forward end curved irons which are pivotally connected to the front side of the first beam of the series of harrow beams. The rear end of the said bar is slotted and a lever is fulcrumed in said slot and the working end of the said lever is pivotally connected by means of a hook with the rear side of the rear beam of the series of beams. A rod is pivotally connected at its forward end to the forward portion of the bar and means are provided for adjustably connecting the rear portion of the said rod with the upper portion of the said lever and an operator's seat is mounted upon the bar.

In the accompanying drawings, Figure 1 is a perspective view of the harrow. Fig. 2 is a top plan view of the same. Fig. 3 is an edge elevation of the same.

The harrow to which the present invention is applied consists of a series of beams 1 having a series of harrow teeth 2. V-shaped links 3 pivotally connect the beams 1 together, the said beams being provided with suitable eyes 4 to receive the intermediate portions of the said links and the end portions of the said links. By providing the V-shaped links as indicated the beams 1 are restrained against relative longitudinal movement but are free to turn upon their axes whereby a flexible harrow structure is effected. Clips 5 are pivotally attached to the foremost beam 1 of the series of beams and draft links or chains 6 of any suitable pattern are connected with the said clips 5. Eyes 7 are mounted upon the forward side of the foremost beam 1 and eyes 8 are mounted upon the rear side of the rear beam 1 of the series of beams. An inflexible bar 9 is provided at its forward end with irons 10 which are of bowed configuration and hooks are provided with hooked extremities 11 which enter the eyes 7 upon the foremost beam 1. The rear end portion of the bar 9 is slitted as at 12. A lever 13 is fulcrumed in the slit 12 and is provided at its lower or working end with a hook 14 which engages the eyes 8 upon the rearmost beam 1 of the series of beams. A rod 15 is pivotally connected at its forward end to the forward portion of the bar 9 and at its rear end portion is flattened and provided in its lower edge with a series of notches 16. A bolt 17 passes transversely through the upper portion of the lever 13 and is adapted to enter any one of the notches 16 at the rear end of the bar 15. A nut 18 is screw threaded upon one end of the bolt 17 and serves as means for clamping the rear end portion of the bar 15 against the side of the lever 13. A flexible seat post 19 is mounted upon the forward portion of the bar 9 and an operator's seat 20 is perched upon the upper end of the said post. A foot rest 21 is located upon the forward portion of the bar 9 in the vicinity of the lower end of the post 19.

In view of the above description it will appear that by adjustably connecting the rear portion of the rod 15 to the upper or power end portion of the lever 13 the slack between the link connections of the beams of the series may be increased or diminished so that the harrow structure as an entirety may have greater or less flexibility as desired. When the rear end of the rod 15 is connected with the upper portion of the lever 13 the pointed ends of the teeth 2 carried by the beams 1 will be forwardly disposed at a desired angle to the surface of the soil.

If during operation the teeth should accumulate trash (which is usually the case) the said teeth may be freed from such accumulation by disconnecting the upper portion of the rod 15 from the upper portion of the lever 13 and permitting the upper end of the lever 13 to swing to the rear. Thus as the means for holding the beams 1 against turning are removed and in view of the fact that the pointed ends of the teeth are in contact with the ground the said pointed ends of the teeth will swing to the rear as the structure is drawn along the ground and consequently the accumulation of trash will be drawn from the pointed ends of the teeth and left in an accumulation upon the surface of the soil. After the teeth have been freed of the trash as indicated the upper portion of the lever 13 may be again connected with the rod 15 when the harrowing operation may be continued.

Having described the invention what I claim as new and desire to secure by Letters Patent is:

A harrow comprising a series of beams, links pivotally connecting the beams together in parallel relation, a bar having at its forward end a return bend which is spaced from the intermediate portion of the bar and which is pivotally connected with the foremost beam of the series, a lever fulcrumed upon the bar, means mounted upon the bar for rigidly holding the lever in adjusted position, a hook pivotally connected with the working end of said lever and pivotally connected with the rearmost beam of the series, a weight receptacle supported upon the bar substantially vertically above the foremost beam of the series, the intermediate portion of said bar being spaced from and located above the beams whereby the beams may have slight individual vertical movement against the horizontal stress to which they are subjected when the parts are drawn tight.

In testimony that I claim the foregoing as my own, I have hereto affixed my signature in the presence of two witnesses.

JAMES SAMUEL JONES.

Witnesses:
L. M. WHITESIDE,
L. M. HOLT.

Copies of this patent may be obtained for five cents each, by addressing the "Commissioner of Patents, Washington, D. C."